Figure 12:
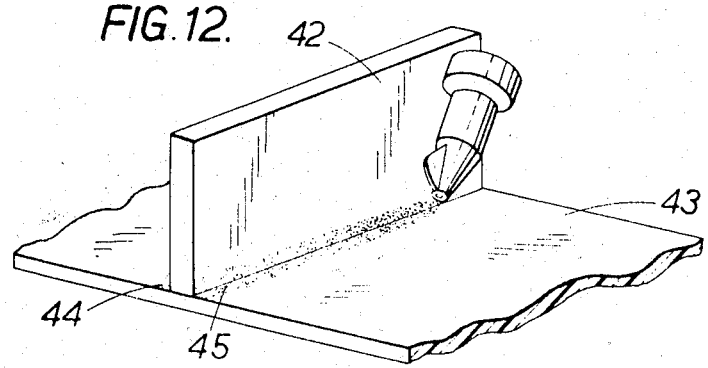

Oct. 18, 1966 R. H. GARDENER 3,279,971
THERMOPLASTIC WELDING NOZZLES
Filed Oct. 25, 1962 3 Sheets-Sheet 3

Inventor
Reginald H. Gardener
By Stevens Davis Miller & Mosher
Attorneys

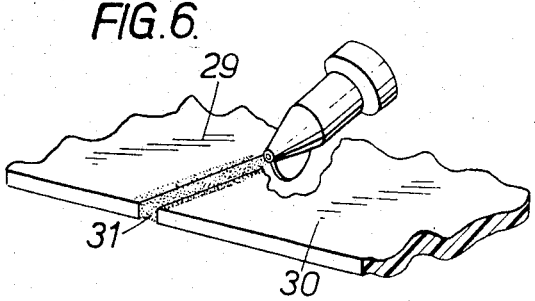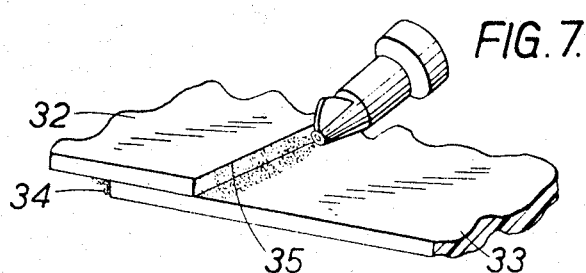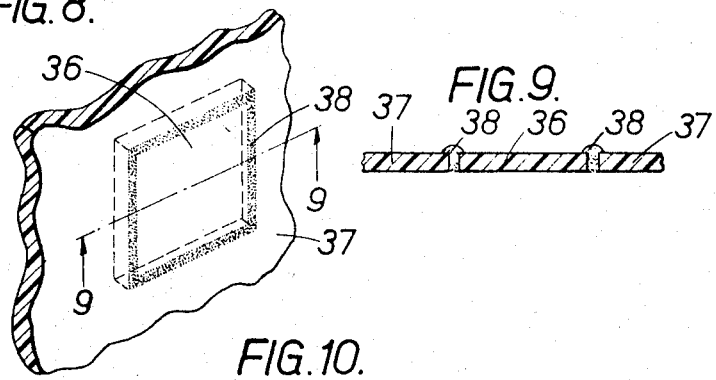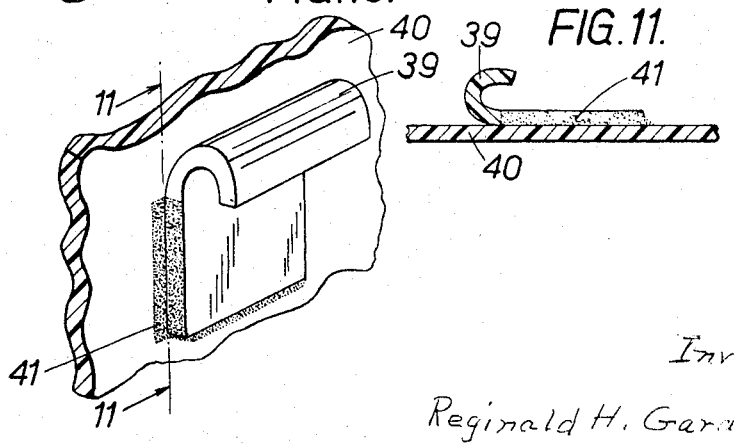

Oct. 18, 1966    R. H. GARDENER    3,279,971
THERMOPLASTIC WELDING NOZZLES
Filed Oct. 25, 1962    3 Sheets-Sheet 1
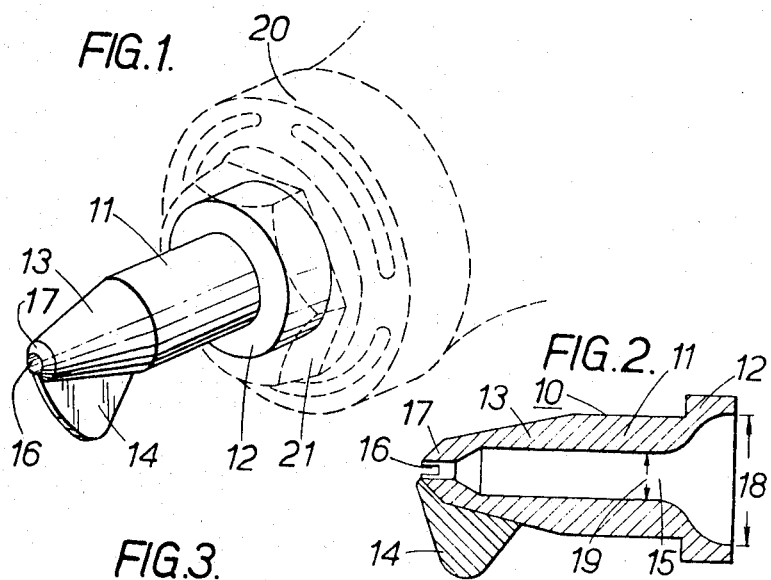
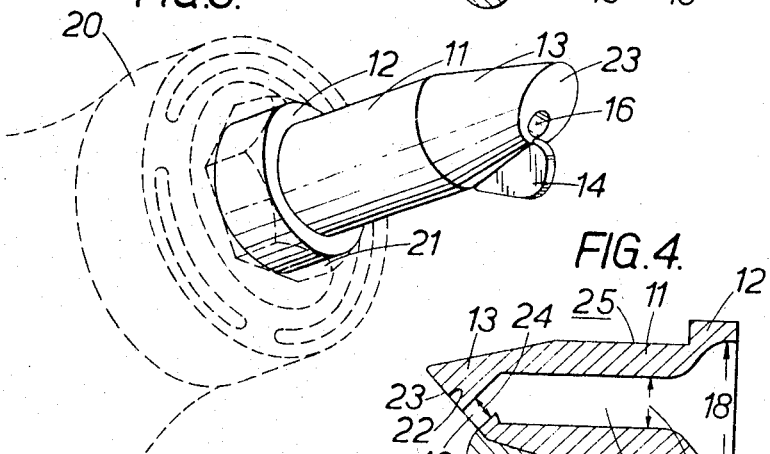
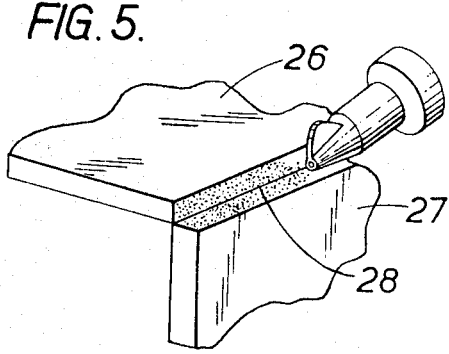
Inventor
Reginald H. Gardener
By Stevens Davis, Miller & Mosher
Attorneys

United States Patent Office 3,279,971
Patented Oct. 18, 1966

3,279,971
THERMOPLASTIC WELDING NOZZLES
Reginald H. Gardener, Edmonton, Alberta, Canada, assignor to Northwest Industries Limited, Edmonton, Alberta, Canada
Filed Oct. 25, 1962, Ser. No. 233,105
Claims priority, application Canada, Aug. 29, 1962, 856,955
5 Claims. (Cl. 156—500)

This invention relates to nozzles. More particularly it is directed to nozzles which are to be attached to an extruding apparatus. In its most preferred form these nozzles are adapted to be attached to a portable plastic extrusion gun, such as, for example, the gun disclosed and claimed in co-pending United States application Serial No. 173,283 filed February 14, 1962, now Patent No. 3,154,811.

For many purposes it is desirable to have a nozzle which can be used for welding two or more pieces of a plastic material together or for filling cracks in a single piece of a plastic material. It is also desirable to weld a plastic handle onto a plastic carton or container.

In the past when it was desired to weld two pieces of thermoplastic materials together, as for example in the butt welding of a polyvinyl chloride pipe, it was necessary to use a procedure which was adapted from welding with metal. In other words, it was necessary to use a welding gun which emitted a blast of hot gas, usually an inert gas to prevent oxidation of a thermoplastic material, and to direct that blast against the pipe to be butt welded as well as against a rod of the same thermoplastic material. The heat of the gas melted the thermoplastic material of the pipe being butt welded and the extruded rod of thermoplastic material, and by suitable feeding of the rod by skilled welders it was possible to butt weld the pipe. As can readily be seen this procedure is awkward, time consuming and requires the employment of highly skilled welders.

An object of one aspect of the present invention is the provision of a nozzle to be used in conjunction with an extrusion apparatus, more particularly a portable extrusion apparatus for effecting the welding of thermoplastic materials.

According to one broad feature of the present invention there is provided a nozzle for use in the extrusion of molten thermoplastic material comprising: a cylindrical body; a frusto-conical nose, said nose being integral with said body; an axial bore communicating between said body and said nose; an aperture in said nose, said aperture communicating with said axial bore; a laterally extending flat lug integral with said frusto-conical nose; and means for attaching said nozzle to an extruding apparatus. By one specific aspect of the invention, the aperture in the nose, and the axial bore communicating between the main cylindrical body and the nose are all co-axial. In another specific embodiment of this feature of the invention, the aperture in the nose extends at an angle to the axis of the axial bore in the main body.

Figure 13:
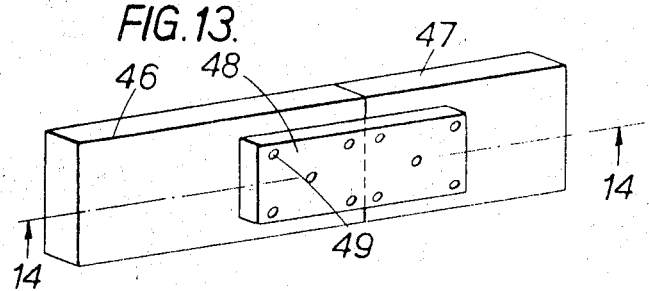
Figure 14:
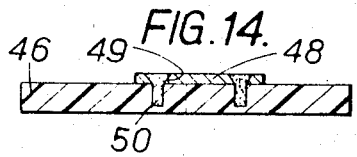
Figure 15:
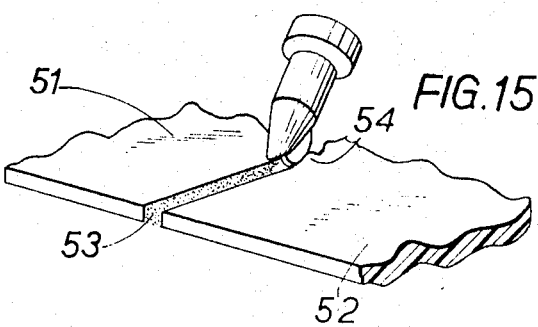

In drawings which illustrate embodiments of this invention:

FIG. 1 is a perspective view of one embodiment of the nozzle of this invention, shown in attached position to a portable extrusion gun, FIG. 2 is a vertical cross-sectional view of the nozzle of FIG. 1, FIG. 3 is a perspective view of another embodiment of the nozzle of this invention, shown in attached position to a portable extrusion gun, FIG. 4 is a vertical cross-sectional view of the nozzle of FIG. 3, FIG. 5 is a perspective view of the formation of an edge weld using the nozzle of FIG. 1, FIG. 6 is a perspective view of the formation of a butt weld using the nozzle of FIG. 1, FIG. 7 is a perspective view of the formation of a lap fillet weld using the nozzle of FIG. 1, FIG. 8 is a perspective view of a repair insert patch weld, FIG. 9 is a cross-section along the line 9—9 of FIG. 8, FIG. 10 is a perspective view of an attachment weld, FIG. 11 is a section along the line 11—11 of FIG. 10, FIG. 12 is a perspective view of the formation of a fillet fillet weld using the nozzle of FIG. 1, FIG. 13 is a perspective view of a rosette weld, FIG. 14 is a section along the line 14—14 of FIG. 13, and FIG. 15 is a perspective view of the formation of a butt weld using the nozzle of FIG. 3.

Turning first to FIGS. 1 and 2, it is seen that the nozzle, indicated generally at 10 is constituted by a main cylindrical body 11, a base shoulder 12 at one end thereof, and a frusto-conical nose 13 at the other end thereof. Formed integral with the nose 13 is a laterally extending flat lug 14. A bore 15 extending along the entire longitudinal axis of the nozzle forms a direct communication from the base 12, through the body 11 and the nose 13 to the aperture 16 in the tip 17 of the nose 13. The bore 15 at the base 12 has a somewhat greater diameter 18 to permit the entry of a maximum amount of material to be extruded. The diameter of the bore then gradually reduces until it is at the main diameter 19, through the body and a major amount of the nose. Then the diameter of the bore is reduced by a frusto-conical configuration until it is the same diameter as the aperture 16.

The nozzle 10 is attached to the portable extrusion gun 20 in any desired and conventional manner. In the embodiment shown in FIG. 1, this attachment is by means of a hexagonal nut 21.

The nozzle 25 shown in FIGS. 3 and 4 differs from that shown in FIGS. 1 and 2 in that the bore 15 is articulated and the nose 13 is of a different shape. Thus, a portion of the leading edge of nose 13 is cut off at 22, to form a flat guiding surface 23. The aperture 16 is formed by boring a hole of diameter 24 through flat surface 23 at right angles thereto near flat lug 14 until the hole intersects bore 15. This aperture 16 extended at an angle to the longitudinal axis of the nozzle 25.

The nozzle 25 is attached to the portable extrusion gun 20 in any desired and conventional manner. In the embodiment shown in FIG. 3, this attachment is by means of a hexagonal nut 21.

The nozzle may be formed of any material which can conduct heat but is not melted at or near the temperature at which the welding operation is to be performed. Thus, metals are the most common materials for the nozzle, and brass, bronze or copper are especially suitable.

The materials to be welded by nozzle of the present invention are thermoplastic synthetic materials. Non-limiting examples of synthetic thermoplastic materials which may be welded include: acetal resins; acrylic resins; acrylonitrile-butadiene-styrene polymers and copolymers; cellulosic polymers; chlorinated polymers; fluorocarbon polymers; polyamides; polycarbonates; polyethylene; polypropylene; polystyrene; and vinyl resins. These are the basic resins but there are all kinds of homopolymers and copolymers which may also be used. In the welding operation, the material being extruded through the nozzle should be the same as the material being welded, so that a homogeneous bond may be formed between the material being welded and the weld.

In FIGURE 5, the two sheets of thermoplastic material 26 and 27 are placed in position for an edge weld. The thermoplastic molten material in the extrusion gun is extruded, in the manner described in Serial No. 173,283, through the aperture 16. Before this takes place, however, the nozzle is heated by conduction from the heated extrusion gun. The hot tip 17 of the nose 13 is placed at the site of the weld so as to melt that area and deform the thermoplastic material. As the molten thermoplastic material is extruded, the nozzle is moved along the line of the weld. Extruded material forms the weld 28, which forms an homogeneous bond with the softened ends of sheets 26 and 27. A ridge of molten material from the sheets 26 and 27 forms at the site of the weld due to the contact at that point of the tip 17 of the nose 13. Extrusion of molten thermoplastic material and movement of the nozzle continues until the weld is compleed. During the welding operation, the ridge of molten material is moved along the site of the weld in advance of the formation of the weld 28.

Preferably, the site of the weld is treated with a suitable solvent material to facilitate the formation of the weld.

In FIGURE 6 a butt weld is formed in an analogous manner. In this instance, the weld 31 is formed between the two sheets 29 and 30 as well as on the top of the sheets. Also, the sheets are preheated and partially melted at the site of the weld by means of the tip 17 of the nose 13 and by the lug 14.

In the lap fillet weld in FIG. 7, the two sheets 32 and 33 are welded together by means of two welds 34 and 35. In this instance, the sheet 33 at the site of the weld is preheated and partially melted mainly by means of the tip 17 of the nose 13. The sheet 32 at the site of the weld is preheated and partially melted mainly by the lug 14.

FIGS. 8 and 9 show a repair insert 36 already welded in place in a sheet 37 by means of weld 38 in the manner described for FIG. 6. The weld 38 extends completely through the thickness of the sheet.

FIGS. 10 and 11 show an attachment weld in which a thermoplastic handle 39 has already been welded to the wall 40 of, for example, a carton, by means of weld 41, in the manner described for FIG. 7.

In the fillet weld of FIG. 12, a sheet 42 is welded perpendicularly to another sheet 43, by means of welds 44 and 45. In this instance the sheets 42 and 43 are preheated and partially melted at the site of the weld mainly by tip 17 of nose 13.

FIGS. 13 and 14 show a rosette or "spot" weld. Two sheets 46 and 47 are edge abutted and a slat 48 placed over both sheets at the joint. A plurality of holes 49 are drilled through the slat 48 and a major distance through sheets 46 and 47. Molten thermoplastic material is then extruded into the preformed holes 49 which have just been preheated and partially melted by the tip 17 of the nose 13, to form the welds 50.

FIG. 15 shows the formation of a butt joint 53 between two sheets 51 and 52, using the nozzle of FIGS. 3 and 4. In this instance, the site of the weld is contacted by the flat guiding surface 23 and the site of the weld is preheated and partially melted by the flat surface 23 and by the lug 14. The lug 14 pushes a ridge 54 of partially molten thermoplastic material derived from the sheets 51 and 52, in advance of the weld 53.

Using the nozzle of the present invention, a completely plasticized new material is extruded into the site of the weld, and this results in the production of a completely homogeneous bond which is molecularly sound. In contrast, in the welding rod technique heretofore used, only the periphery of the rod was softened during the welding process. Thus, using the nozzle of the present invention, bonds may be obtained having a strength of up to 96 percent of the parent material, while with the methods used heretofore, strengths of the order of 80 percent have been obtained.

Another advantage of the present invention is the speed of welding, expressed in terms of inches per minute. By the techniques of the prior art, an expert welder using the rod technique can weld a ⅛ inch thick sheet at a rate of about 6 inches per minute. Using the nozzle of the present invention, an inexpert welder can weld a ⅛ inch thick sheet at a rate of at least 12 inches per minute, and an expert welder can weld the same sheet at a rate of about 15 inches per minute.

What I claim is:
1. A nozzle comprising:
 (a) a cylindrical body;
 (b) a frusto-conical nose, said nose being integral with said body;
 (c) an axial bore communicating between said body and said nose;
 (d) an aperture in said nose, said aperture communicating with said axial bore of said nose;
 (e) a laterally extending flat lug integral with said frusto-conical nose; and
 (f) means for attaching said nozzle to an extruding apparatus.

2. A nozzle comprising:
 (a) a main cylindrical body;
 (b) a secondary enlarged cylindrical base integral with said main cylindrical body;
 (c) a frusto-conical nose, said nose being integral with said body;
 (d) an axial bore communicating between said base, said body, and said nose;
 (e) an aperture in said nose, said aperture communicating with said axial bore, the aperture in said nose being co-axial with said axial bore;
 (f) a laterally extending flat lug integral with said frusto-conical nose; and
 (g) means associated with and co-operating with said base for attaching said nozzle to an extruding apparatus.

3. The nozzle of claim 2 wherein the diameter of said axial bore in said base is initially larger than, but then is reduced to, the diameter of said axial bore in said main body, and wherein the diameter of said axial bore in said nose is initially of the same diameter as that of said axial bore in said main body and is then reduced to the diameter of the aperture in the nose.

4. A nozzle comprising:
 (a) a main cylindrical body;
 (b) a secondary larger cylindrical base integral with said main cylindrical body;
 (c) a frusto-conical nose, said nose being integral with said body, the front face of said nose being inclined with respect to the longitudinal axis of said nozzle;
 (d) an axial bore communicating between said base, said body and said nose;
 (e) an aperture in the front face of said nose, said aperture extending at right angles to said front face, and communicating with said axial bore;
 (f) a laterally extending flat lug integral with said frusto-conical nose; and
 (g) means associated with and co-operating with said base for attaching said nozzle to an extruding apparatus.

5. The nozzle of claim 4 wherein the diameter of said bore in said base is initially larger than, but then is reduced to, the diameter of said bore in said main body.

References Cited by the Examiner
UNITED STATES PATENTS

| | | | |
|---|---|---|---|
| 2,220,545 | 11/1940 | Reinhardt | 156—304 |
| 2,380,138 | 7/1945 | Abramson | 15—504 |
| 2,930,063 | 3/1960 | Stull | 15—545 X |
| 3,008,862 | 11/1961 | Haine et al. | 156—244 |

EARL M. BERGERT, *Primary Examiner.*

T. R. SAVOIE, *Assistant Examiner.*